United States Patent [19]

de Loye et al.

[11] 4,005,933
[45] Feb. 1, 1977

[54] COPYING AND TELECOPYING DEVICE

[75] Inventors: Martin de Loye, Paris; Michel Béduchaud, Villebon-sur-Yvette, both of France

[73] Assignee: Compagnie Industrielle des Telecommunications Cit-Alcatel, Paris, France

[22] Filed: Aug. 6, 1975

[21] Appl. No.: 602,523

[30] Foreign Application Priority Data

Aug. 9, 1974 France .............. 74.27732

[52] U.S. Cl. .................. 355/66; 355/49
[51] Int. Cl.² .............. G03B 27/70; G03B 27/48
[58] Field of Search ......... 355/66, 67, 71, 47, 355/8, 11, 57, 60, 65, 48, 49, 50, 51

[56] References Cited
UNITED STATES PATENTS

| | | |
|---|---|---|
| 2,478,555 | 8/1949 | Yule ................................. 355/49 |
| 3,709,602 | 1/1973 | Satomi ............................... 355/49 |
| 3,737,225 | 6/1973 | Aughton ............................ 355/48 |
| 3,819,265 | 6/1974 | Feldman et al. ................... 355/51 |

*Primary Examiner*—Donald A. Griffin

[57] ABSTRACT

Copying and telecopying device using a mechanism ensuring the analysis of a document by a scanning beam which, transmitted from the document, is sent to a drum coated with selenium. According to the invention, the equipment is completed by a laser source whose beam can be directed along two parallel incident paths, to a helical mirror, one of the beams being used for the analysis of the document and the transmission of the information at a distance, the other beam being modulated by a facsimile signal and being directed onto the drum coated with selenium.

5 Claims, 2 Drawing Figures

COPYING AND TELECOPYING DEVICE

The present invention relates to the reproduction of documents. It concerns more particularly a copying and tele-copying device which can ensure both the direct reproduction of a document and the transmission at a distance of the information which is contained therein, or the reproduction of the analyzed document at a distance.

In known equipment for the copying of documents, a document to be reproduced is analyzed by the scanning of successive zones of that document by means of an analysis beam emitted by a light source. The light sent back by the document is directed by optical means onto a photosensitive means to ensure the reproduction of the document in its original format. The scanning of the successive zones is obtained by moving the document in front of an analysis window, the light source and the optical means then being fixed. The scanning of the successive zones can also be obtained, in a known variant, by moving the window and the source in front of the fixed document. In both cases, the optical means comprises reflectors arranged on either side of a lens, or of a set of lenses. When the light source and the analysis window undergo a linear movement in front of the fixed document, the reflectors sending back the light transmitted from the document onto the lens also undergo a linear movement so that the optical path between the document and the lens is kept constant.

The photosensitive reproduction means can be constituted, as is well known, by a drum covered with selenium which is electrically charged. The drum is driven in a rotating movement about its axis; it is partly discharged by the light which it receives. An inking system deposits ink on the parts of the drum remaining electrically charged; the ink is transferred onto ordinary paper and is fixed thereon to ensure the reproduction of the original document.

As a variant, the photosensitive reproduction means can be photosensitive paper which undergoes a linear movement at the same time as the document.

In this device, the original document and the drum covered with selenium (or the photosensitive paper) are each placed at twice the focal distance from the lens to obtain a unitary enlargement.

In known devices for telecopying documents, a document to be reproduced, which is laid flat, is analyzed by scanning, by means of a fine light beam, emitted, for example, by a laser. The laser beam is deviated along a line of the document by optical means which is, to great advantage, constituted by a helical mirror borne by a drum driven in a rotating movement. The laser beam can be deviated from one line to the other of the document by other optical means. In a variant, the scanning from one line to another of the document can be obtained by is step movement of the document. These telecopying devices can be used for transmitting as well as for receiving signals bearing the information contained in the document analyzed.

When transmitting, a photoelectric sensor receives the light transmitted by the document during the analyzing thereof and transforms the light intensity sent back by the successive points of the document into electrical signals which are transmitted in the line.

When receiving, the laser beam is modulated by the information received from the device operating in the transmission mode, the modulated laser beam effecting the reproduction of the document analyzed at a distance.

The present invention aims at producing a single device operating in the copying and telecopying mode.

It has as its object a copying and telecopying device for the analysis and reproduction of a document comprising a first light source for the scanning of the document for the analysis thereof during the relative movement of the document and of the said first source, photosensitive means for ensuring the reproduction of the document and first optical means for the deviation and projection of the light transmitted by the document, during the analysis thereof, on photosensitive means, a second light source, a modulator controlled by a signal coming from the analysis of a document, second optical means for linear deviation for sending out, from the said second source brought into play, a first thin beam received by the said optical means for ensuring the line-by-line scanning of the document, or a second thin beam modulated for ensuring the reproduction of the document analyzed on the said photosensitive means and further comprising, a third retractable optical element belonging to the said first optical means directing the light coming from the analysis of the document from the first source on the said photosensitive means and directing the said deviated beam coming from the said second source on the document with a view to the analyzing thereof and a photosensitive detector collecting the light transmitted by the document analyzed from the second source, characterized in that it comprises, moreover, a cylindrical lens combined with the said second optical means to constitute the optical input element of the said first deviated beam said lens, having a plane input face with a length substantially equal to the deviation of the said first beam and arranged perpendicular to the said first beam.

Other characteristics and the advantages of the present invention will become apparent from the description given hereinafter of a general embodiment illustrated in the drawing in which.

The copying and telecopying device comprises a photosensitive means scanned by a light beam after analysis of a document or by a light beam modulated by a signal bearing information concerning a document to be reproduced at a distance.

Figure 1:
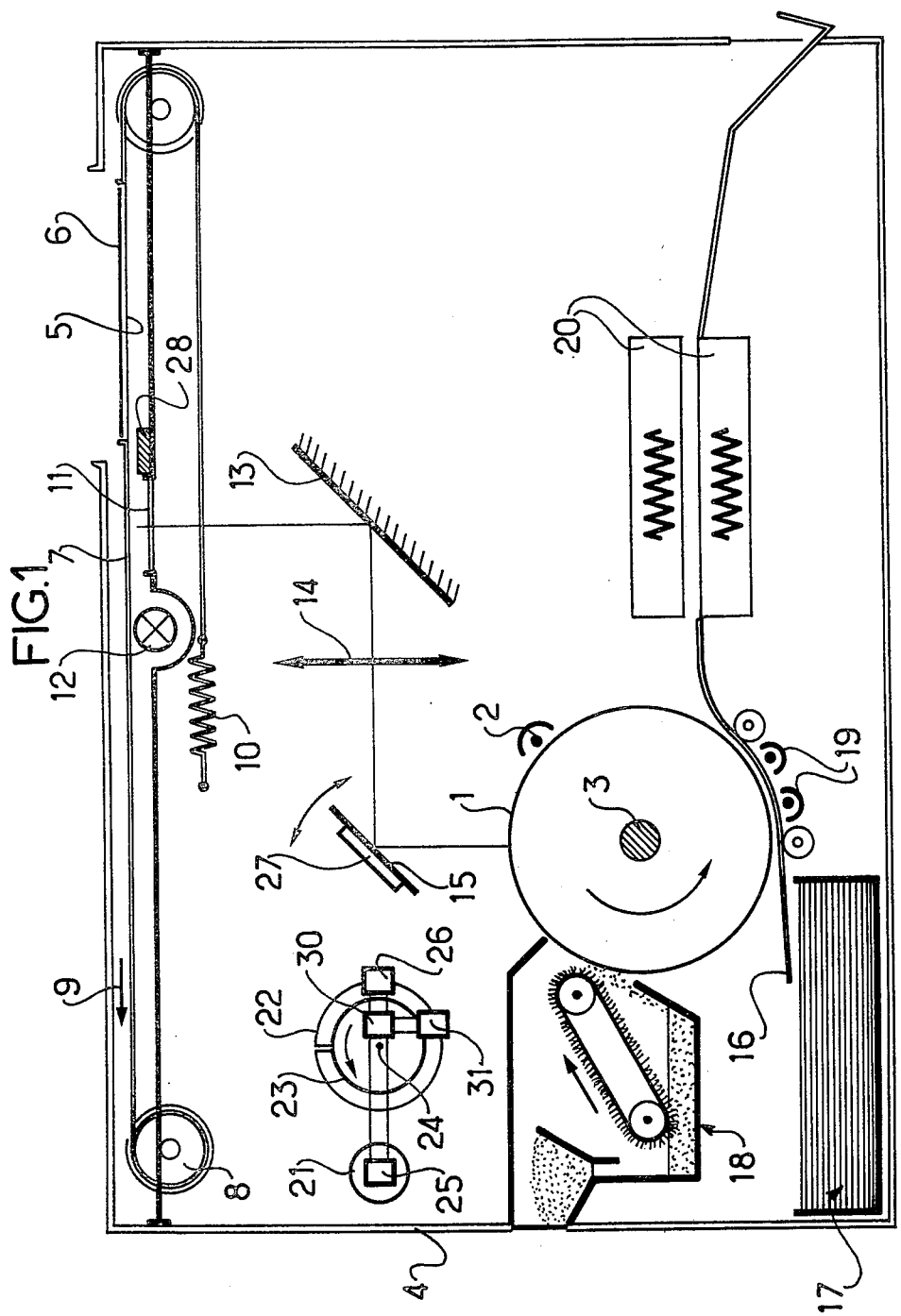
FIG. 1 is a cutaway view of a copying and telecopying device according to the invention.

In FIG. 1, the photosensitive means is constituted by a cylinder 1 covered with selenium charged electrically by a wire 2 brought to a high potential. The cylinder 1 is mounted mobile and is free to rotate about its axis 3, in the bottom part of a box 4 for the protection of the copying and telecopying assembly.

The top face of the box 4 forms a document case 5 accommodating a document 6 to be analyzed. That document holder 5 is a transparent carriage driven in a linear movement by belts 7 which are wound onto a pulley 8 driven by a motor, not shown; that motor is, for example, of the electromagnetic clutch type. The linear movement of the document holder carriage 5 is diagrammatically shown by the arrow 9. At the end of the run of the carriage 5, the motor is disengaged, and a return spring 10 effects the return of the carriage into the initial position, shown in FIG. 1.

An analysis window 11, arranged under the run of the carriage 5, co-operates with a luminous ramp 12 to effect the lighting up of the part of the document 6 facing the window 11. A first reflecting mirror 13 receives the light transmitted back by the document and directs it onto the lens 14. A second mirror 15 then reflects the light coming from the lens 14 onto the cylinder 1 covered with selenium.

In this device, the part of the document 6 level with the analysis window 11 as well as the cylinder 1 covered with selenium are each placed at twice the focal distance from the lens 14, to obtain a unitary enlargement between the document 6 and its image on the drum 1.

The reproduction of the document 6 is made on normal paper 16 drawn from a storage magazine 17 under the action of the cylinder 1 driven in a rotating movement. The light, transmitted by the document and directed by the mirrors 13 and 15 and the lens 14 on the cylinder 1, discharges the cylinder 1 partly. An inking system 18, of known type, deposits ink on the parts of the cylinder remaining charged with electricity after reception of the light beam. Electrical means 19 make it possible to transfer the ink from the cylinder 1 to the paper 16 driven with the cylinder 1. After reception of the latent image borne by the cylinder 1, the paper 16 passes in an oven 20 which fixes the ink on it.

The equipment previously described ensures a direct reproduction of a document analyzed by the light beam coming from the light ramp 12.

Figure 2:
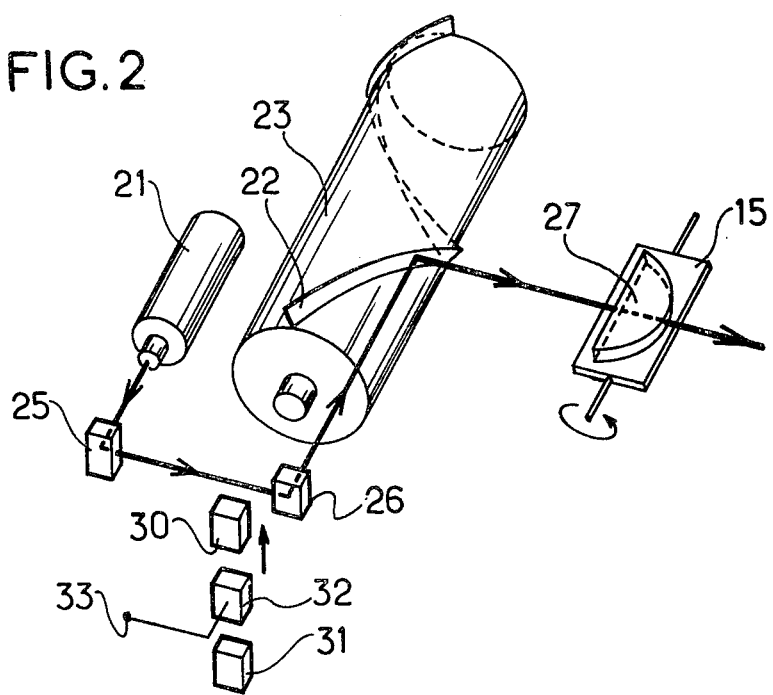
FIGS. 2 and 3 show parts of the device according to FIG. 1 operating in the copying and telecopying mode.
Figure 3:
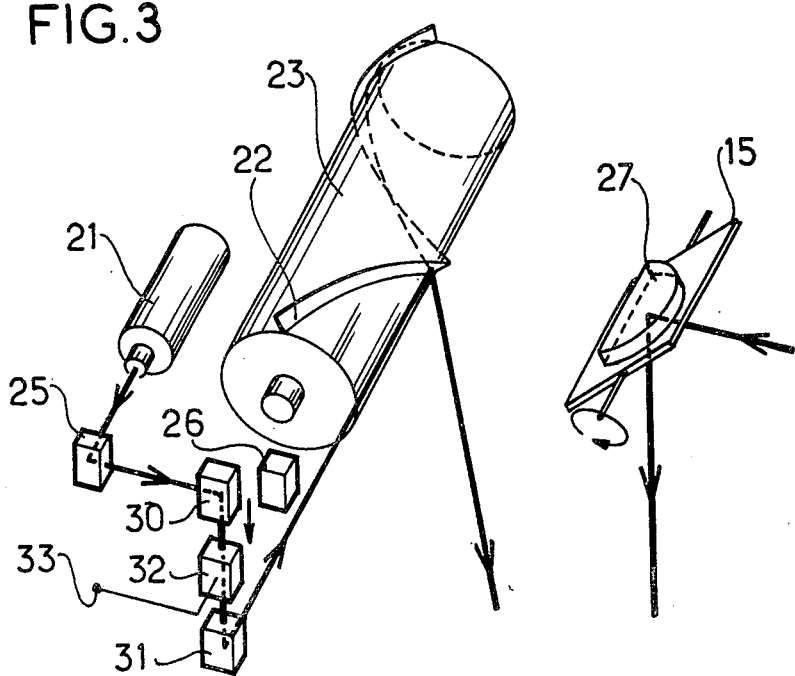

The device comprises, moreover, as shown in FIGS. 1, 2 and 3, a light source 21 emitting a thin beam of light, constituted here by a laser. That thin light beam is received by an optical means for deviating the beam along a line, perpendicular to the plane of FIG. 1. The optical means for linear deviation is constituted by a helical mirror 22 borne by a mobile drum 23 which rotates about its axis 24 perpendicular to the plane of FIG. 1. As shown in FIGS. 1 and 2, the helical mirror 22 receives the beam coming from the laser 21 crossing the optical reflecting means, for example two reflecting prisms diagrammatically shown at 25 and 26 in a direction parallel to the generating lines of the drum 23. When the drum 23 rotates by one turn, the laser beam is deviated along a line; the deviated beams are parallel to each other.

A cylindrical lens 27 having a plane input face whose length is at least equal to the length of the drum 23 receives the laser beam deviated by the helical mirror 22. The successive beams are received by the cylindrical lens 27 perpendicular to its plane input face, as may be seen more clearly in FIG. 2. The faces of the lens 27 which are perpendicular to the incident beam are polished the cylindrical lens 27 directs the deviated laser beam onto the aforementioned lens 14; it makes it possible to cancel the diaphragm effect of the opening of the aforementioned lens 14 which is a great drawback due to the directivity of the laser beam. The plane input face of the cylindrical lens 27 is positioned at twice the focal distance from the lens 14. The laser beam, emitted at 21 and deviated by the helical mirror 22 is directed, by means of the cylindrical lens 27, the lens 14 and the mirror 13, onto the document 6 through the analysis window 11. It ensures the scanning of a line of the document 6 through the window 11 during its deviation along the input face of the cylindrical lens 27 by the helical mirror 22. A photoelectric sensor 28, for example a photodiode, installed with the light ramp 12 in the vicinity of the document 6, collects the light transmitted by the document 6. As the document 6 advances in front of the analysis window 11, the successive lines of the document 6 are scanned by the laser beam. The sensor 28 transforms the light received into electric signals which will be transmitted in a line. The equipment operates in the telecopying transmission mode.

With reference to FIGS. 1, 2 and 3, it will be seen that this equipment is, moreover, completed by an extra optical means constituted by an optical square 30, well-known per se (prism at 45°). The optical square 30 is installed between the beam coming from the laser 21 crossing the first reflecting prism 25 and the second reflecting prism 26 for reflecting the laser beam onto the helical mirror 22. At the output of the optical square 30, the reflected beam is perpendicular to the incident beam, according to the well-known property according to which, in an optical square, the incident and reflected rays are normal whatever the position of the square may be in relation to the incident ray. A reflecting prism 31 co-operates with the optical square 30 to direct the laser beam onto the helical mirror 22 in a direction parallel to the laser beam deviated by the preceding two reflecting prisms 25 and 26. A modulator 32 is interposed on the path of the laser beam between the optical square 30 and the reflecting prism 31. It receives a signal bearing information on the input 33, such signal having been obtained from a device for analyzing a document, operating at a distance in the transmission mode and being transmitted to that device operating in the receiving mode. The modulator 32 can be replaced by a direct modulation of the supply current of the laser.

In the embodiment illustrated in the figures, the mirror 15 of the optical copying assembly and the cylindrical lens 27 of the optical telecopying assembly operating in the transmission mode are installed so that one is tilted and does not intercept any light beam when the other should intercept it and vice-versa. To great advantage, as shown, the cylindrical lens 27 is, for that purpose, installed on the back of the mirror 15 and the assembly formed by 15 and 27 is installed so as to pivot by 90° about the middle axis through 15 according to the two illustrations given in FIGS. 2 and 3. In FIG. 2 illustrating the operation in the telecopy transmission mode, the laser beam is received by the lens 27 in a direction perpendicular to its input face, whereas the mirror 15 is retracted. FIG. 3 shows, in the right-hand part, operation in the copying mode; the mirror 15 deviates the beam received; the lens 27 at its back does not intercept that beam. Likewise, the optical square 30 is installed free to move linearly to intercept or not intercept the laser beam, according to whether the device operates in the telecopy receiving mode (FIG. 3, left-hand side) or in the telecopy transmission mode (FIG. 2) as shown in FIGS. 2 and 3. The drive means for the mirror 15 and for the cylindrical lens 27 on the one hand and for the optical square 30 are of types known per se; for that reason, they have not been shown, the respective drives having simply been symbolized by arrows associated with these elements.

Of course, at the time of the operation in the copying mode, the light ramp 12 is lit up; the laser 21 and the photodiode 28 do not operate. Conversely, during operation in the telecopying mode, the ramp 12 is turned off and the laser 21 operates.

The present invention has been described with reference to an embodiment. It is obvious that, without going beyond the scope of that invention, details can be modified therein and/or certain means can be replaced by other technically equivalent means therein. More particularly, in the optical means of the device operating in the copying mode, the document 6 can be fixed; in that case, the analysis window 11, the lamp 12 and the photodiode 28 are mobile. The system will comprise, then, three reflecting mirrors for reflecting the beam back onto the lens 14; a first mirror will be driven with the lamp 12 at the same speed; the other two will be driven in the same way but at half the speed, so as to keep a constant optical path whatever the position of the analyzed document.

The reflecting elements 25, 26 and 30, 31 can also be constituted by other equivalent optical means placed in the path of the laser beam so that the helical mirror receives the two incident laser beams respectively deviated in two different directions.

We claim:

1. Copying and telecopying device for the analysis and reproduction of a document comprising a first light source ensuring the scanning of the document for the analysis thereof during relative movement of the document and the said first source, photosensitive means for ensuring the reproduction of the document, first optical means for the deviation and projection of the light transmitted by the document, during the analysis thereof, on the photosensitive means, a second light source, a modulator controlled by a signal coming from the analysis of a document, second optical means for linear deviation for sending out, from the said second source, a first thin beam received by the said optical means for ensuring the line-by-line scanning of the document, or a second thin beam modulated for ensuring the reproduction of the document analyzed on the said photosensitive means, a third retractable optical element belonging to the said first optical means positioned for directing the light coming from the analysis of the document from the first source to the said photosensitive means and for directing the said deviated beam coming from the said second source to the document for the analyzing thereof and a photosensitive detector collecting the light transmitted by the document from the second source, a cylindrical lens combined with the said second optical means to constitute the optical input element of the said first deviated beam, said cylindrical lens having a plane input face with a length substantially equal to the deviation of the said first beam and arranged perpendicular to the said first beam.

2. Copying and telecopying device according to claim 1 in which the said third optical element is a pivoting mirror arranged as an output element for the said first optical means, said cylindrical lens being integral with the pivoting mirror and fixed to the back thereof.

3. Copying and telecopying device according to claim 2, wherein said cylindrical lens is mobile with the said pivoting mirror by a quarter of a turn about the axis of the mirror to receive the said first thin deviated beam, then the mirror is retracted whereas the said cylindrical lens is retracted when the said mirror is placed in the path of the beam coming from the said first source.

4. Copying and telecopying device according to claim 3 wherein said second optical means comprises a helical mirror mounted on a drum which is mobile and free to rotate about its axis, said helical mirror receiving the light beam coming from the said second source in a direction parallel to the drum axis and a retractable optical element which can be placed, upstream from the said helical mirror, in the path of the light beam coming from the said second source to define two distinct incident paths.

5. Copying and telecopying device according to claim 1 wherein said second optical means comprises a helical mirror mounted on a drum which is mobile and free to rotate about its axis, said helical mirror receiving the light beam coming from the said second source in a direction parallel to the drum axis and a retractable optical element which can be placed, upstream from the said helical mirror, in the path of the light beam coming from the said second source to define two distinct incident paths.

* * * * *